June 4, 1957   G. A. DAINES ET AL   2,794,563
LUG FEEDING MECHANISM FOR INDEXING LAMP-MAKING MACHINE
Filed Sept. 1, 1953   5 Sheets-Sheet 1
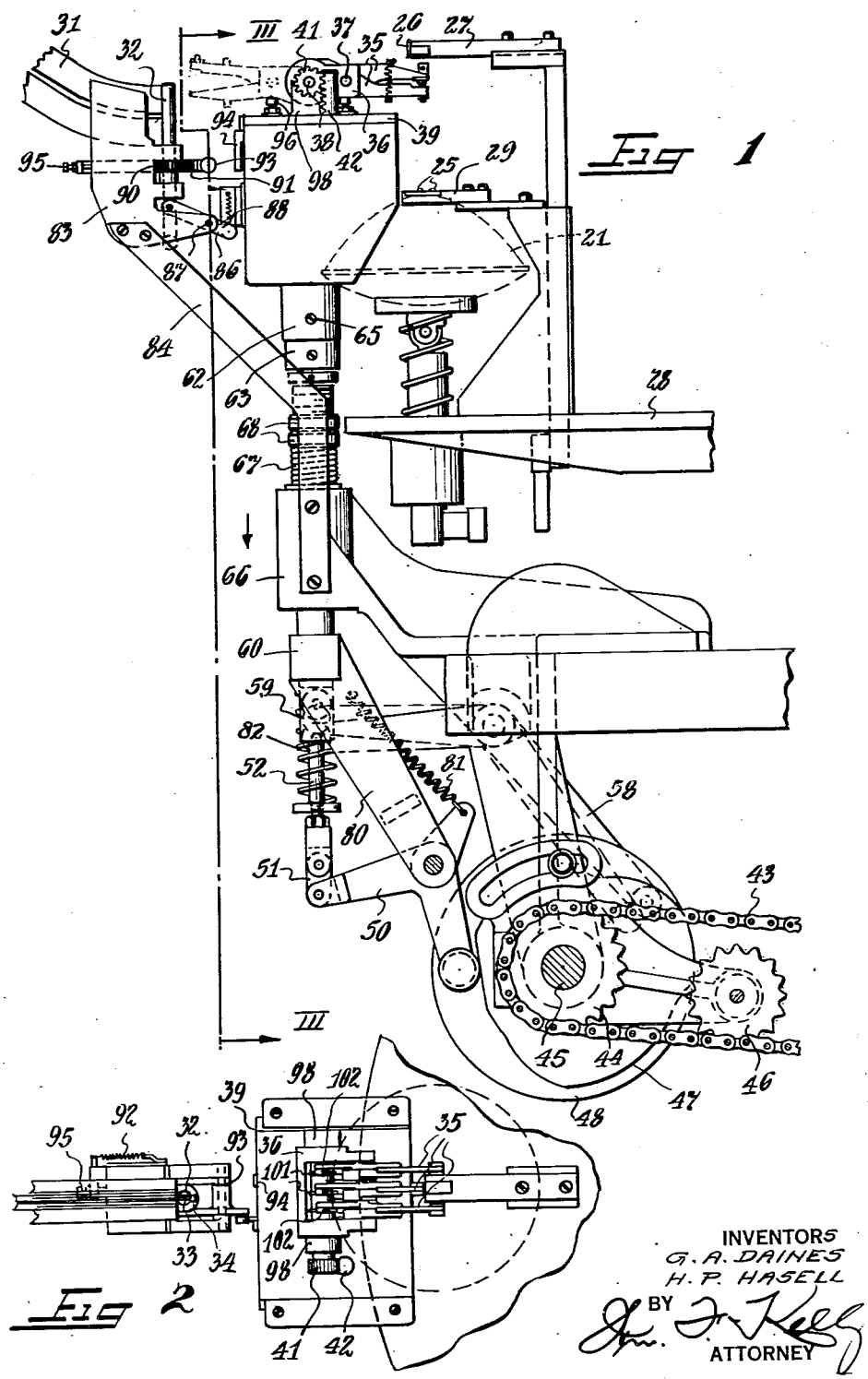
INVENTORS
G. A. DAINES
H. P. HASELL
BY
ATTORNEY

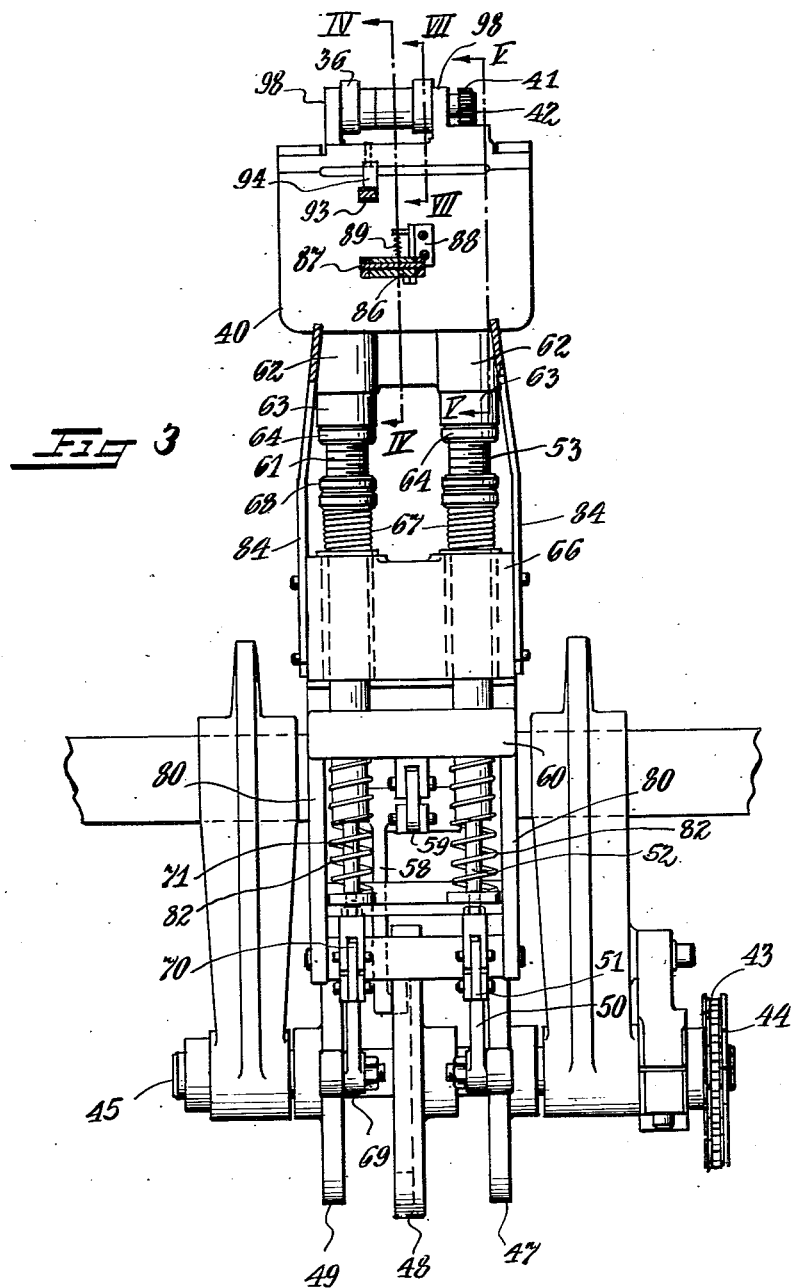

June 4, 1957   G. A. DAINES ET AL   2,794,563
LUG FEEDING MECHANISM FOR INDEXING LAMP-MAKING MACHINE
Filed Sept. 1, 1953   5 Sheets-Sheet 3
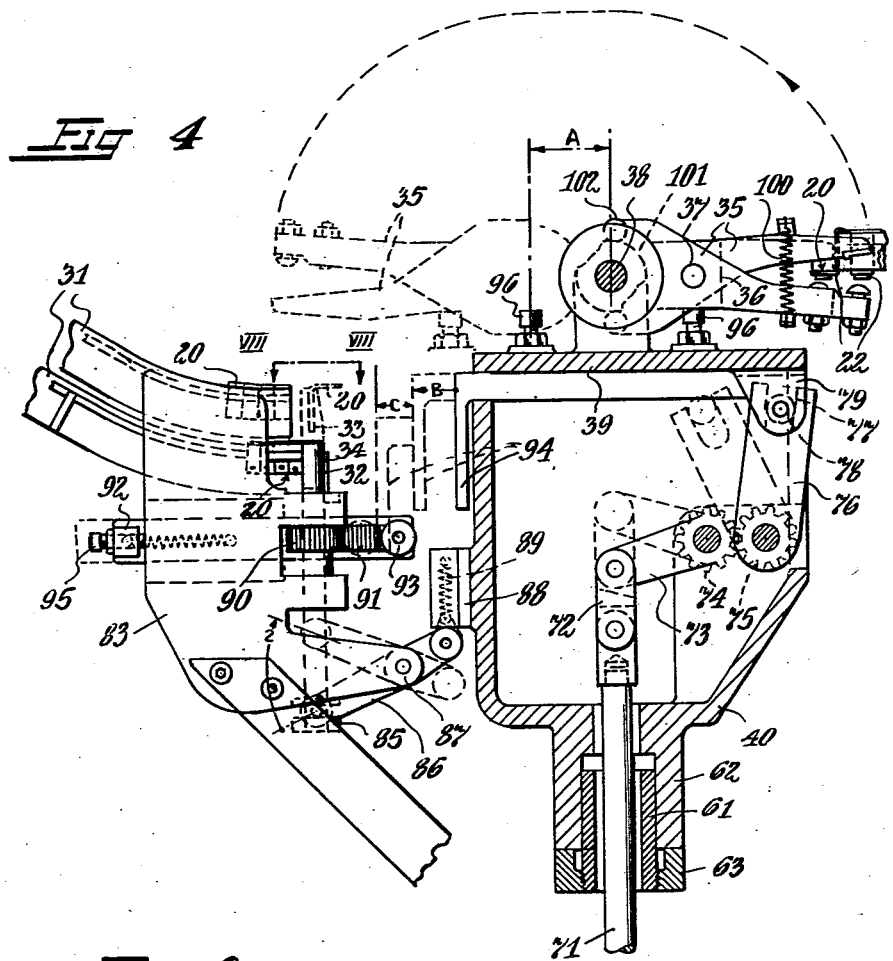
Fig. 4
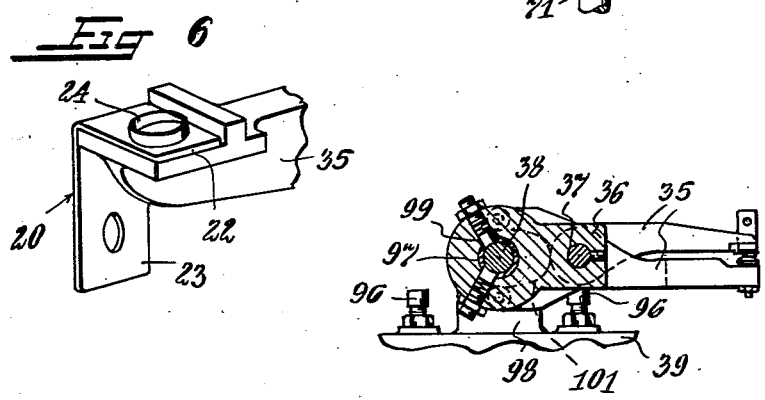
Fig. 6
Fig. 7
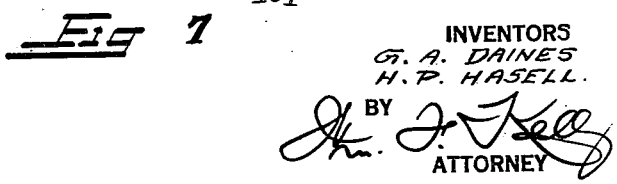
INVENTORS
G. A. DAINES
H. P. HASELL
BY
ATTORNEY

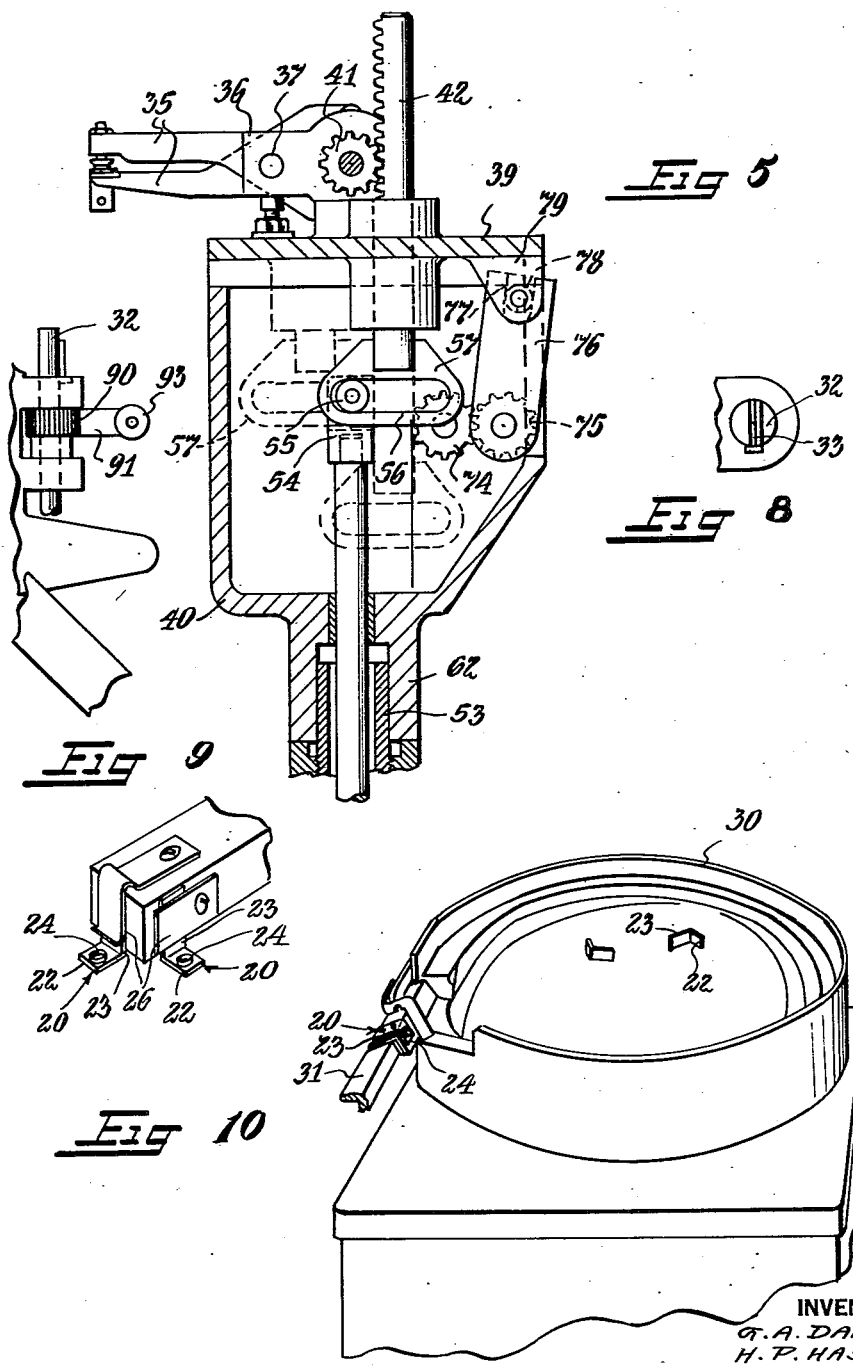

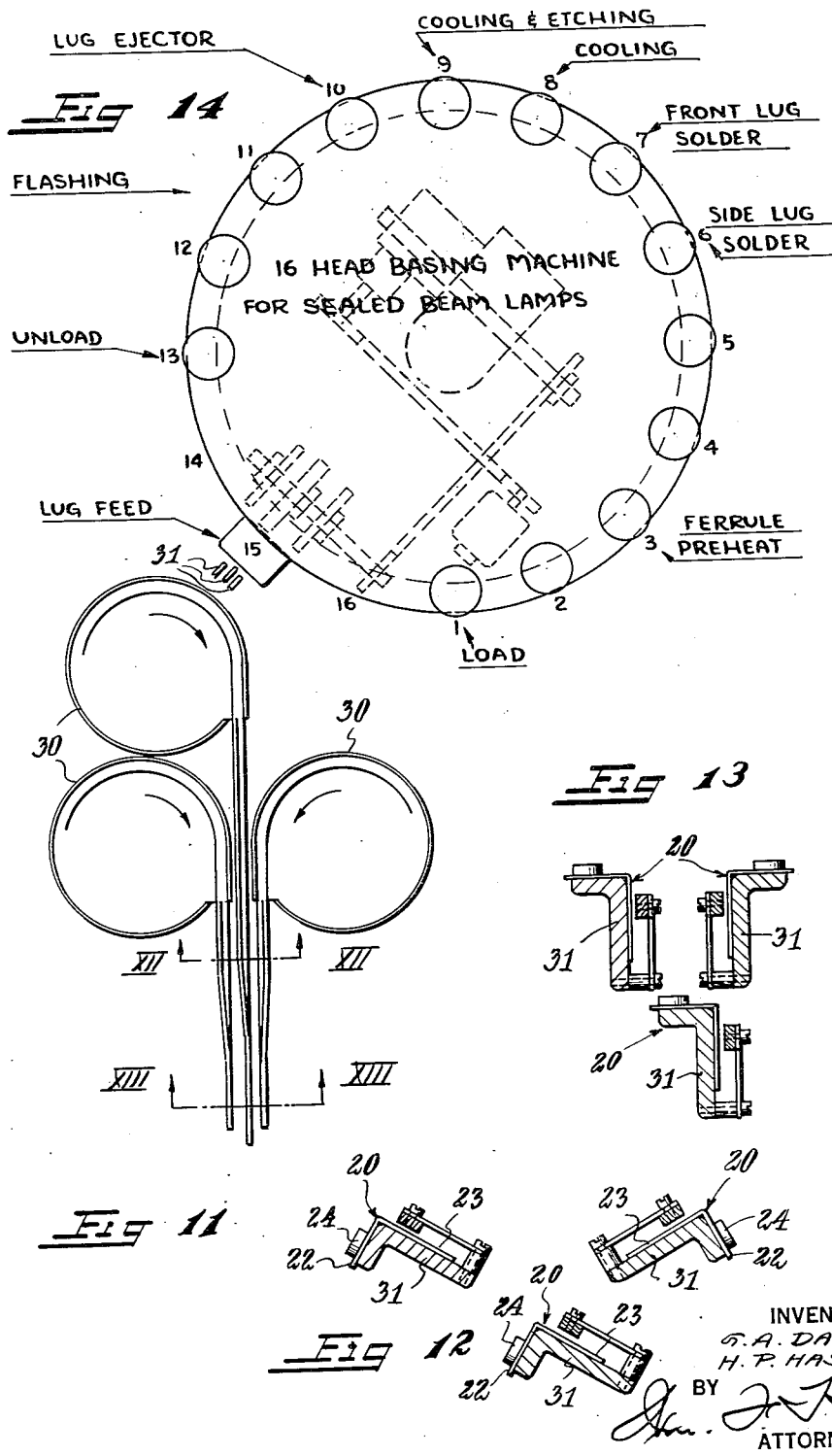

United States Patent Office 2,794,563
Patented June 4, 1957

2,794,563

LUG FEEDING MECHANISM FOR INDEXING LAMP-MAKING MACHINE

Geoffrey A. Daines, West Caldwell, and Henry P. Hasell, Bloomfield, N. J., assignors to Westinghouse Electric Corporation, East Pittsburgh, Pa., a corporation of Pennsylvania Application September 1, 1953, Serial No. 377,854

7 Claims. (Cl. 214—146.5)

This invention relates to lug feeding mechanism for indexing lamp-making machines, and more particularly to the introduction of the lugs in a holder for seal-beam headlight lamps and the like.

The invention contemplates proper orientation of the lugs and introduction thereof into a holder which travels with the machine rotor, it having been necessary heretofore to apply the lugs individually by hand to the holder thus requiring one operator for that purpose and another operator to load the lamp.

In its general aspects, the invention also contemplates full automatic manipulation and placing of the lugs in the holder at a single indexed station of the machine rotor without aid of an operator.

More specifically, the invention provides for automatic feeding of the lugs in a plurality of channels or guideways and a pair of jaws for the lugs of each channel to simultaneously pick up lugs from all of said channels.

The invention also provides for rotating one of said lugs prior to the jaw pick-up thereof for orienting the same at a different angular disposition from the lugs picked up from the other channels.

Another object of the invention is to accomplish both the proper orientation of the lugs prior to pick-up, the delivery and introduction thereof to and into the holder and the release of the transfer jaws all within one indexed stop of the rotor and at a single station.

Other objects of the invention will appear to persons skilled in the art to which it appertains as the description thereof proceeds, both by direct recitation and by inference from the context.

Referring to the accompanying drawings, in which like numerals of reference indicate similar parts throughout the several views:

Figure 1 is an elevation of the lug-feeding mechanism of this invention, shown in conjunction with a portion of the indexing machine on which the lug-feeding mechanism is applied;

Figure 2 is a plan view of the same;

Figure 3 is an elevational section on line III—III of Fig. 1 in the direction of the arrows;

Figure 4 is a vertical section on line IV—IV of Fig. 3 in the direction of the arrows;

Figure 5 is a vertical section on line V—V of Fig. 3 in the direction of the arrows, but showing the jaws closed and gripping a lug;

Figure 6 is a perspective view of a portion of one transfer jaw with one of the lugs thereon;

Figure 7 is a sectional view of the jaw cradle with associated jaws and stops, taken on line VII—VII of Fig. 3 in the direction of the arrows;

Figure 8 is a plan of the orienting means for effecting a 90° change of position for a lug, taken as from line VIII—VIII of Fig. 4 in the direction of the arrows;

Figure 9 is a perspective view of a portion of one of the holders with lugs carried thereby;

Figure 10 is a perspective view of one feeder source and channel or guideway for supplying lugs to the indexing machine;

Figure 11 is an outline view of the bank of feeders and channels for a plurality of lugs to be applied simultaneously;

Figure 12 is a cross section of the guideways as on line XII—XII of Fig. 11 in the direction of the arrows;

Figure 13 is a similar cross section taken on line XIII—XIII of Fig. 11 in the direction of the arrows; and Figure 14 is a diagrammatic plan of the indexing machine showing the several stations and relation therewith of the feeding mechanism of the present invention.

In the specific disclosure illustrated, lugs 20, such as shown in Fig. 6, are to be applied to a lamp, such as the seal-beam lamp 21 outlined in Fig. 1. The lugs are conveniently prefabricated from strip material cut into lengths and bent transversely at right angles into bracket shape, thereby providing a basal flange 22 and a projecting side-flange 23. The basal flange has a ringed opening 24 which has to be aligned with the appropriate nipple 25 protruding from the lamp so that when the two are brought together the lug will slide onto the nipple and may be soldered in place in operation of the machine. All of the lugs have to be located with the basal flanges in a common plane and directed outwardly, and the mechanism accordingly is made to orient three lugs and insert the side flanges behind respective spring clips 26 (Figs. 1 and 9) at the two sides and end of a holder 27, of the machine. There is a holder for each index station of the machine rotor 28, said holders revolving with the rotor and arranged, as usual, to have a vertical motion for moving the lugs downwardly toward the lamp and thereby apply the lugs to the corresponding nipples of said lamp and holding them in position on the nipples while the soldering operations are performed to permanently secure the lugs on the nipples. Thereafter in the sequential indexing of the machine, the holders return to an upward position ready for the next cycle. It will be understood that since the lamp is held with respect to the rotor by a forked retainer 29 (Fig. 1) during the cycle of operation, the upward movement of holder 27, above mentioned, cannot raise the lamp, but the lugs which are then soldered to the lamp will be slidingly released from the spring clips 26 behind which they had been inserted.

Auxiliary machines 30, such as the one pictured in Fig. 10, are available on the market as a feeder source for arranging and progressively advancing articles to and along a channel or guideway 31. Three such machines as shown in Fig. 11 are utilized in the present instance to supply lugs in sequential order for the three positions required for filling the holder 27. The mechanism of the present invention simultaneously picks up the three lugs presented at the ends of the three channels or guideways. As it is desired to make this presentation of the lugs with the basal flange horizontal and the side flange dependingly vertical, as shown in Fig. 13, and as the machine of the feeder source more readily arranges the lugs with the basal flange vertical and side flange horizontal, the channels or guideways 31 are formed with a longitudinal spiral twist of 45°. Fig. 12 shows the lugs in transit along the twisted portion of the channel. The side channels or guideways deliver the lugs with the basal flanges thereof projecting oppositely outward at a common level. The middle channel terminates at a lower level than the other two channels and delivers its lug to an orienting spindle 32 (Figs. 1, 2, 4, 5 and 8). The upper end of said spindle has a diametric vertical slot 33 therein for receiving the vertical flange of the lug, said slot being closed by a stop 34 at the side of the spindle away from the guideway so that a lug introduced into the spindle from said guideway is stopped from passing out the other side of the spindle. The diameter of the spindle is chosen to just accommodate a lug in the slot so that the next approaching lug cannot enter the slot until the first one has been removed.

Said spindle (Figs. 1, 2, 4, 5 and 8) is rotatable through an angle of 90° so as to orient the lug to turn the basal flange to a direction away from the guideway as shown in dotted lines in Fig. 4, and is also longitudinally movable to bring the basal flange of the lug carried thereby up to the level of the basal flanges of the lugs fed by the other two guideways. The means effecting these movements of the spindle will be described hereinafter.

Three pairs of jaws 35 (Figs. 1, 2, 4, 6 and 7) are provided, one pair for each of the three lugs simultaneously presented, and these several pairs of jaws are manipulated to move into juxtaposition to the basal flanges of the lugs; to grip those flanges; to rise vertically for lifting the lugs from the guideways and spindle; to invert or swing through an angle of 180° for locating the lugs in position to be engaged in the holder of the rotor; to open and release the lugs; and to return to repeat the cycle. In its general aspect, the construction for accomplishing these various movements comprises a U-shaped yoke 36 (Figs. 1–5 and 7) between the arms of which is a hinge pin 37 upon which all of the jaws of the pairs of jaws are pivotally mounted so the jaws may open and close. The base end of the U-shaped bracket is rotatably mounted upon an axle 38 parallel to said hinge pin. As will be described below, the yoke has frictionally-resisted lost motion connection with the axle and means for opening the jaws by virtue of the differential of motion between the axle and yoke. The axle 38 is trunnioned on a horizontally slidable carriage 39 which has a movement transverse to said axle toward and away from the guideways. Said carriage is at the top of a housing 40, said housing being mounted to move vertically. Fast on the axle 38 is a pinion 41 and in mesh therewith is a rack 42 which is vertically slidable through the carriage and depends into said housing. Vertical reciprocation of the rack through the carriage rotates the pinion, but the lateral movement of the carriage and the vertical movement of the housing and carriage introduce substantially no relative motion between the rack and pinion.

The movements of housing 40, carriage 39 and rack 42 are all coordinated with each other and with the indexing of the machine to which the invention is applied. For this purpose a chain drive 43 (Figs. 1 and 3) is shown from the said machine driving a sprocket 44 on a main shaft 45 for the attachment. A chain tightener 46 is shown so that the drive will not have any backlash. On said shaft are shown in succession a first cam 47 for operating afore-mentioned rack 42, a second cam 48 for applying vertical motion to the housing 40, and a third cam 49 for moving the carriage 39 horizontally.

A bell crank lever 50 (Figs. 1 and 3) makes roller contact with the first said cam, the other arm of said lever connecting through the agency of a link 51 with the bottom end of a vertically extending slide rod 52 which passes through a movable sleeve 53 into said housing. Within the housing said rod, as shown in Fig. 5, has a terminal 54 mounting a roller 55 which rides in a slot 56 transverse to the rod and formed in a transverse foot 57 at the bottom of said rack 42. Vertical movement of the rod consequently will impart longitudinal movement to the rack and yet the rack may move laterally to the extent the slot 56 permits.

The second or middle cam 48 (Figs. 1 and 3) is provided to impart vertical motion to the housing 40 and for that purpose is shown making roller contact with a second bell crank 58 (Figs. 1, 3 and 4) the other arm of which makes a link connection 59 with a cross bar 60. One end portion of the cross bar is made fast upon afore-mentioned sleeve 53 and the other end portion of said cross bar is made fast to a second sleeve 61, paralleling the first one 53 so that both sleeves move simultaneously. These sleeves are fixed with respect to the housing 40 and the present showing provides a sliding fit for the upper end of each sleeve into a hollow boss 62 at the underside of the housing. Below the sliding fit the sleeve is exteriorly threaded and a collar 63 thereon bears against the bottom of said boss affording an adjustment in assembly. After adjustment has been made, for height to afford solid support for the housing from the sleeves, a lock nut 64 secures the collar in fixed position and a set screw 65 through the boss is tightened against the end portion of the sleeve to keep the housing from being lifted off of the same. The threaded portion of the sleeve projects downwardly from the housing and at a distance therebelow again provides a smooth outer surface which affords a sliding fit through a bracket 66 secured to a fixed part of the machine. Springs 67 are located on said sleeves 53 and 61, bearing at their lower ends against said bracket 66 and bearing at their upper ends against adjusting nuts 68 on the threaded portion of the sleeves thereby tending to keep the housing elevated.

The third cam 49 operates a third bell crank lever 69 (Fig. 3) which has operative connection through a link 70 with the lower end of a second vertically extending slide rod 71 which extends upwardly through second sleeve 61 into the housing 40 as shown in Fig. 4. The upper end of this second slide rod (Fig. 4) connects through a link 72 with a lever 73 the other end of which is fast with respect to a gear 74, said gear meshing with another gear 75 also trunnioned in the housing and fast with respect to an upwardly extending carriage actuating lever 76. Said carriage actuating lever has a slot 77 at its upper end which receives a roller 78 carried upon a boss 79 depending from the carriage, and by this means lateral movement of the carriage is obtained.

It will be noted that since the housing 40 (Fig. 4) has a vertical motion, it is desirable to avoid introduction of relative displacement between the slide rods and housing due to that vertical motion of the housing. For this purpose, the bell crank levers 50 and 69 (Figs. 1 and 3) connecting with said slide rods 52 and 71 are both carried at their pivotal mounting from brackets 80 fixed and depending from cross bar 60. Thus when the sleeves and housing move, the slide rods and bell cranks connected thereto also move and the cam surfaces for those bell crank levers are designed to take care of the bodily shifting of the cam levers. Springs such as shown at 81 may be provided to maintain contact of the rollers of the bell crank levers against the cam surfaces, and springs 82 may also be provided on the slide rods to overcome back-lash by introducing a continuous resilient pressure to maintain the rods normally downward as far as permitted by the cams.

Since explanation has now been given as to the several operative movements applied to the housing 40, carriage 39 and rack 42, it is appropriate to continue description of the orienting and transfer of the lugs. It has been indicated above that the middle one of the three lugs is received in a spindle 32 (Figs. 1, 2 and 5) by which it is both rotated 90° and elevated. Both of these movements are imparted to the spindle by operation of the carriage and housing. As the cycle of operation first raises the spindle and thereafter rotates it, these will be explained in that order.

Orienting spindle 32 (Figs. 1, 2, 4, 5 and 8) has appropriate bearings in a saddle 83 fixed to the stationary part of the machine, said saddle being shown supported by bars 84 bolted to the sides of fixed bracket 66. The lug-feeding guideways are carried at their lower ends by this saddle 83 in consequence of which proper relation of feed of the lugs to the pick-up mechanism and spindle is maintained. The bottom of the spindle has a peripherally grooved head 85 (Fig. 4) thereon which receives the forked ends of a transversely disposed lever 86 pivoted medially at 87 to a fixed part of saddle 83. Said lever projects at its other end toward housing 40 and is drawn upward against the underface of a dog 88 on said housing by a spring 89. Each time housing 40 descends, spindle 32 rises, and then when the housing rises, said spring pulls upon the lever and returns the spindle to its initial downward position. Raising the spindle elevates the lug carried thereby to a position such that the horizontally disposed basal flange 22 thereof will be brought into the same plane as the basal flanges of the two side lugs stopped at the ends of their respective channels or guideways. As yet, however, the basal flange of the middle lug, that is, the lug just raised by the spindle, is projecting to one side but is required to project toward the housing. Mechanism is accordingly provided to effect a 90° rotation of the spindle and lug.

Splined on said spindle is a pinion 90 (Figs. 1, 4 and 5) mounted so as to be restrained from axial displacement and in mesh with a rack 91 horizontally and slidably mounted in said saddle and projecting toward housing 40. A tension spring 92 draws the rack toward the housing and positive actuation away from the housing is obtained by engagement of a roller 93 at the end of the rack toward the housing by a vertically disposed pusher 94 depending from and movable with the carriage. Forward location of the rack toward the housing is adjusted by a set screw 95 carried by the rack, said set screw being engageable against a fixed part of the saddle. As the carriage moves toward the lugs, the pusher 94, at the proper distance, engages the rack and slides it just far enough to rotate the pinion through the desired quarter turn. As will be understood from the dotted line positions of the pusher 94 in Fig. 4, the initial portion of reciprocation of the carriage which has a total travel distance A, moves the pusher 94 a distance B before contact is made with the rack and final movement of the carriage toward the lug through distance C occurs with the pusher in engagement with the rack thereby operating the same and rotating the spindle. All three lugs are now at the same level and in position to be gripped by the three pairs of jaws 35 for inversion and transfer to be received by the holder 27.

It will be understood from the above description that the housing 40 (Fig. 4) is at its lowered position when the orienting spindle is in its raised position ready to deliver the lug therein to the jaws, and it is while in that position that the carriage 39 moves toward the lugs and brings the pairs of jaws into position to grip the horizontal flanges of said lugs. The cam operation for the carriage 39 and for the vertical rack 42 by which the jaws are opened, closed and inverted are arranged to slide the open jaws into juxtaposition to the lugs by upward sliding of both rods 52 and 71 in proper coordination. Sliding of rod 52 acts through foot 57 on the rack 42 to raise said rack and thereby rotate pinion 41 in a direction to swing the yoke 36 and jaws 35 toward the waiting lugs. The jaws have previously been opened to discharge the previously transferred lugs, and remain open as they swing to the pick-up position. Substantially at pick-up position of the jaws, the carriage is slid toward the lugs, thereby locating the gripping ends of the jaws above and below the lug flanges, and at this time the yoke 36 is in engagement with a stop 96 (Figs. 1 and 7) on the carriage so it can swing no further, but the rack continues to rotate the pinion and thereby closes the jaws upon the lugs by virtue of the frictionally resisted lost motion previously mentioned and now to be described in detail.

Rack-operated pinion 41 (Figs. 1, 2, 3 and 5) is fast upon axle 38 at the outside of one of the yoke arms. Upon said axle and within the yoke arm is a bushing 97. As shown in Fig. 7, spring-loaded friction pins 99 are mounted in the yoke arm and are directed radially toward the shaft and have their ends extending through said bushing 97 into engagement with the axle 38. The frictional engagement produced by these pins with the axle adequately suffices to revolve the yoke 36 with the axle until the yoke is positively stopped by either one of two stops 96, adjustably projecting from the carriage at opposite sides of the axle at the two ends of the path of oscillation of the yoke. The axle has a further amplitude of rotation after the yoke is stopped and it is this additional rotation which is referred to as the frictionally resisted lost motion. When the axle reverses its direction of rotation, the yoke immediately swings with it until stopped again at the other end of its oscillation by the other stop 96.

It is by virtue of the above-described frictionally resisted lost motion between yoke 36 and axle 38 that the jaws 35 are operated to opened and closed positions. It will be remembered that the jaws 35 are of scissors type with a hinge pin 37 carried by the yokes parallel to axle 38, so that each jaw of a pair of jaws has a rearward extension which extends past the axle 38, one over and one under the same. As the jaws of each pair cross each other at the hinge pin after the manner of an X, separation of the extensions of the jaws separates the gripping ends of the jaws, and, vice versa, moving the extensions toward each other moves the gripping ends toward each other. Springs 100 (Fig. 1) on the jaws are arranged to normally close the jaws to gripping position. Located on the axle 38 and fixed to rotate therewith is a cam 101 (Figs. 2, 4 and 7), said jaw extensions are juxtaposed at diametrically opposite peripheral faces, said cam to be operated thereby, intervening rollers 102 being provided to reduce friction and wear. It will be appreciated that since all of the pairs of jaws in the present showing are operated simultaneously, it will suffice in this instance to utilize a single cam, if so desired, for the three pairs of jaws, but individual cams 101 as indicated in Fig. 2 may be employed. From the above described construction and operation it will also be appreciated that the cam and jaws rotate simultaneously with the yoke, and in addition, the cam rotates with respect to the jaws during the lost-motion portion of the axle and yoke oscillation. The cam 101 is arranged to have depressions to receive rollers 102 and permit the springs 100 to close the jaws at one end of oscillation thereof and arranged with an adjacent peripheral portion which raises the rollers and opens the jaws at the other end of oscillation thereof.

In view of the foregoing description, operation of the jaws 35 will be understood as effecting a closing thereof when swung down to horizontal position toward the pick-up end of their oscillation by continued rotation of axle 38 after engagement of the yoke 36 with the stop 96 at that side of the axle. The lugs having been gripped, the axle is reversed in direction of rotation and because of the frictional engagement the yoke immediately follows along so the grip is not disturbed until the yoke swings over to the other stop 96 whereupon further rotation of the axle will rotate the cam 101 with respect to the jaw extensions and thereby open the jaws. This final lost-motion rotation of the shaft is arranged to occur after housing 40 has ascended to introduce the upstanding flanges of the lugs in the clips 26 of said holder. Thereupon the jaws open, the carriage retracts and the cycle is repeated, the jaws remaining open as the yoke swings back to the pick-up side of the machine.

We claim:

1. A lug attaching machine for lamps and the like having a holder for applying lugs therein to a lamp in oriented position for attachment to the lamp, comprising feeder channels for a plurality of lugs, means for orienting one of said lugs to different position from its position in said feeder channel, and pick-up mechanism for gripping and inverting said one of said lugs and a lug from each of the other channels simultaneously, said pick-up mechanism presenting all of the lugs gripped thereby to said holder.

2. A lug attaching machine for lamps and the like having a holder for applying lugs therein to a lamp in oriented position for attachment to a lamp, comprising a vertically movable housing, a horizontally movable carriage on said housing, a rack extending through said carriage into said housing, reciprocating driving means extending oppositely to said rack into said housing and having operative connection in all positions of the carriage for sliding said rack, a pinion in mesh with said rack, and a jaw connected with said pinion operable thereby to swing from one position to another as the pinion is rotated by said rack.

3. A lug attaching machine for lamps and the like having a holder for applying lugs therein to a lamp in oriented position for attachment to a lamp, comprising a vertically movable housing, a horizontally movable carriage on said housing, a rack extending through said carriage into said housing, carriage shifting means in said housing, and a pair of slide rods entering said housing and respectively connected with said rack and said carriage shifting means for operating the same.

4. A mechanism for feeding lugs comprising a housing, a carriage on said housing slidable transversely thereof longitudinally of the carriage, a jaw mounting yoke and a pair of jaws pivoted in said yoke, said yoke being mounted to swing the jaws as a unit to project at either end of the carriage, and said jaws and yoke having a lost-motion connection by which the jaws may have greater amplitude of swing than the yoke, and means providing frictional retention of the jaws to swing with said yoke throughout the amplitude of swing of the yoke and by overcoming said frictional retention to swing further than said yoke.

5. A mechanism for feeding lugs comprising a housing, a carriage on said housing slidable transversely thereof longitudinally of the carriage, a rotatable axle on said carriage, a jaw-mounting yoke on said axle, stops limiting swing of said yoke, frictional means connecting said yoke to said axle for causing the yoke to swing from stop to stop with said axle and permitting further rotation of the axle after rotation of the yoke is stopped by a stop, a cam fast on said axle and engageable with said jaws for opening and closing said jaws at the opposite ends of amplitude of swing thereof by said further rotation of said axle.

6. In combination for a machine for attaching lugs to lamps and the like, lug receiving means at one level and a lug feeding device, said lug feeding device comprising a feeder channel for each lug, at a level different from said receiving means, a housing movable between said levels, a carriage movable on said housing between said channels and said lug receiving means, a pair of jaws for each feeder channel and rotatable on said carriage and operable to grip said lugs on said feeder channels and to invert said lugs during movement of said carriage toward said lug receiving means, and means at the opposite ends of the amplitude of swing of said jaws for opening and closing said jaws.

7. In combination for a machine for attaching lugs to lamps and the like, lug receiving means at one level and a lug feeding device, said lug feeding device comprising a feeder channel for each lug at a level different from said receiving means, a housing movable between said levels, a carriage movable on said housing between said channels and said lug receiving means, orienting means adjacent the delivery end of one of said channels for receiving a lug therefrom and operable by movement of said housing to raise said lug and further operable by movement of said carriage to rotate said lug to a desired oriented position, a pair of jaws for each feeder channel and rotatable on said carriage and operable to grip said lugs on said feeder channels and said orienting means to invert said lugs during movement of said carriage toward said lug receiving means, and means at the opposite ends of the amplitude of swing of said jaws for opening and closing said jaws.

References Cited in the file of this patent

UNITED STATES PATENTS

| | | |
|---|---|---|
| 1,311,590 | Bingham | July 29, 1919 |
| 1,783,642 | Ferguson et al. | Dec. 2, 1930 |
| 1,811,832 | Meyers | June 23, 1931 |
| 1,857,815 | Lafferty | May 10, 1932 |
| 1,953,492 | May | Apr. 3, 1934 |
| 2,001,814 | Buckminster | May 21, 1935 |
| 2,071,123 | Hubelmeyer | Feb. 16, 1937 |
| 2,547,551 | Yost et al. | Apr. 3, 1951 |